(12) United States Patent
Fujita

(10) Patent No.: US 11,821,879 B2
(45) Date of Patent: Nov. 21, 2023

(54) AUTOSAMPLER FOR CHROMATOGRAPH

(71) Applicant: SHIMADZU CORPORATION, Kyoto (JP)

(72) Inventor: Takaaki Fujita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 140 days.

(21) Appl. No.: 17/436,918

(22) PCT Filed: Mar. 13, 2019

(86) PCT No.: PCT/JP2019/010338
§ 371 (c)(1),
(2) Date: Sep. 7, 2021

(87) PCT Pub. No.: WO2020/183663
PCT Pub. Date: Sep. 17, 2020

(65) Prior Publication Data
US 2022/0128521 A1   Apr. 28, 2022

(51) Int. Cl.
*G01N 30/46* (2006.01)
*G01N 30/24* (2006.01)
(Continued)

(52) U.S. Cl.
CPC ............. *G01N 30/24* (2013.01); *G01N 30/20* (2013.01); *G01N 30/46* (2013.01); *G01N 30/88* (2013.01); *G01N 2030/8804* (2013.01)

(58) Field of Classification Search
CPC ........ G01N 30/24; G01N 30/20; G01N 30/46; G01N 30/88; G01N 2030/8804
(Continued)

(56) References Cited

U.S. PATENT DOCUMENTS 6,344,172 B1 *  2/2002  Afeyan ................... B03C 3/155
                                                          422/527
10,192,726 B1 *  1/2019  Wiederin ................. G01N 1/38
(Continued)

FOREIGN PATENT DOCUMENTS

JP    H05-5727 A      1/1993
JP    2002-340876 A   11/2002
(Continued)

OTHER PUBLICATIONS

International Search Report for corresponding Application No. PCT/JP2019/010338, dated Jun. 18, 2019.
(Continued)

*Primary Examiner* — John Fitzgerald
*Assistant Examiner* — Rodney T Frank
(74) *Attorney, Agent, or Firm* — Renner, Otto, Boisselle & Sklar, LLP

(57) ABSTRACT

An autosampler for a chromatograph includes a first injection port through which a sample is injected into a first analysis flow path of the chromatograph, a second injection port through which a sample is injected into a second analysis flow path of the chromatograph, a needle that is movable to both of the first injection port and the second injection port, and injects a sample into the first injection port and the second injection port, a first sample loop that stores a sample to be injected into the first analysis flow path, a second sample loop that stores a sample to be injected into the second analysis flow path, and a metering pump that loads a sample in the first sample loop and the second sample loop.

6 Claims, 11 Drawing Sheets

(51) Int. Cl.
*G01N 30/20* (2006.01)
*G01N 30/88* (2006.01)

(58) Field of Classification Search
USPC .................................................. 73/863.01
See application file for complete search history.

(56) References Cited

U.S. PATENT DOCUMENTS

| | | | |
|---|---|---|---|
| 11,543,390 B2* | 1/2023 | Yanagibayashi | G01N 30/20 |
| 2012/0240666 A1* | 9/2012 | Sims | G01N 30/465 |
| | | | 73/61.56 |
| 2013/0333452 A1* | 12/2013 | Suzuki | G01N 35/1095 |
| | | | 73/64.56 |
| 2015/0316516 A1* | 11/2015 | Albrecht, Jr. | G01N 30/20 |
| | | | 73/61.56 |
| 2016/0238573 A1* | 8/2016 | Venkatramani | G01N 30/463 |
| 2018/0284079 A1 | 10/2018 | Yasunaga | |

FOREIGN PATENT DOCUMENTS

| | | |
|---|---|---|
| JP | 2013-024601 A | 2/2013 |
| JP | 2016-070695 A | 5/2016 |
| JP | 2018-169350 A | 11/2018 |

OTHER PUBLICATIONS

Written Opinion for corresponding Application No. PCT/JP2019/010338, dated Jun. 18, 2019 (English machine translation).
Office Action for corresponding Jp Application No. 2021-504720 dated Feb. 1, 2022, with English machine translation.
Office Action for corresponding Chinese Application No. 201980092887.2 dated Jul. 17, 2023, with English machine translation.

* cited by examiner

AUTOSAMPLER FOR CHROMATOGRAPH

TECHNICAL FIELD

The present invention relates to an autosampler used in a chromatograph.

BACKGROUND ART

In a liquid chromatograph, an autosampler that injects a sample into an analysis flow path is used. In the autosampler, a needle sucks a sample from a vial (or a well formed in a plate) and injects the sample into the analysis flow path.

The below-mentioned Patent Document 1 discloses a liquid chromatograph that shares an autosampler and a detector using a plurality of measurement blocks. While a sample that has been injected by the autosampler is measured in one column (measurement column), a process such as equilibration is performed in another column (waiting column). When the measurement in the measurement column ends, the waiting column is switched to be a measurement column, and a measurement process is executed.
[Patent Document 1] JP 2018-169350 A

SUMMARY OF INVENTION

Technical Problem

With the liquid chromatograph disclosed in the above-mentioned Patent Document 1, a waiting column can be prepared while measurement is executed in a measurement column. Thus, it is possible to continue analysis processes while switching columns. However, it is not possible to execute analysis processes in a plurality of columns at the same time.

A system for injecting a sample using an autosampler includes two types of systems: a loop injection system and a total volume injection system. With either one of the loop injection system and the total volume injection system, a sample loop is connected to an analysis flow path during an analysis process. That is, because there is only one sample loop that can be connected to the analysis flow path, even in a case where a liquid chromatograph includes a plurality of columns, only one column can execute an analysis process at one time.

A plurality of types of analysis processes may be required to be executed with respect to the same sample. In a case where the state of sample changes over time, it is necessary to use two liquid chromatographs and execute analysis processes in parallel and at the same time in order to execute a plurality of types of analysis processes with respect to the same sample at one time. That is, it is necessary to prepare a plurality of autosamplers in order to execute a plurality of types of analysis processes with respect to the same sample at one time.

An object of the present invention is to provide an autosampler that can execute a plurality of analysis processes in a chromatograph.

Solution to Problem

A first aspect of the present invention relates to an autosampler for a chromatograph that includes a first injection port through which a sample is injected into a first analysis flow path of the chromatograph, a second injection port through which a sample is injected into a second analysis flow path of the chromatograph, a needle that is movable to both of the first injection port and the second injection port, and injects a sample into the first injection port and the second injection port, a first sample loop that stores a sample to be injected into the first analysis flow path, a second sample loop that stores a sample to be injected into the second analysis flow path, and a metering pump that loads a sample in the first sample loop and the second sample loop.

Advantageous Effects of Invention

It is possible to execute a plurality of analysis processes by using an autosampler for a chromatograph of the present invention.

DESCRIPTION OF EMBODIMENTS

[1] First Embodiment

The configuration of a liquid chromatograph according to embodiments of the present invention will be described next with reference to the attached drawings.

(1) Overall Configuration of Liquid Chromatograph

Figure 1:
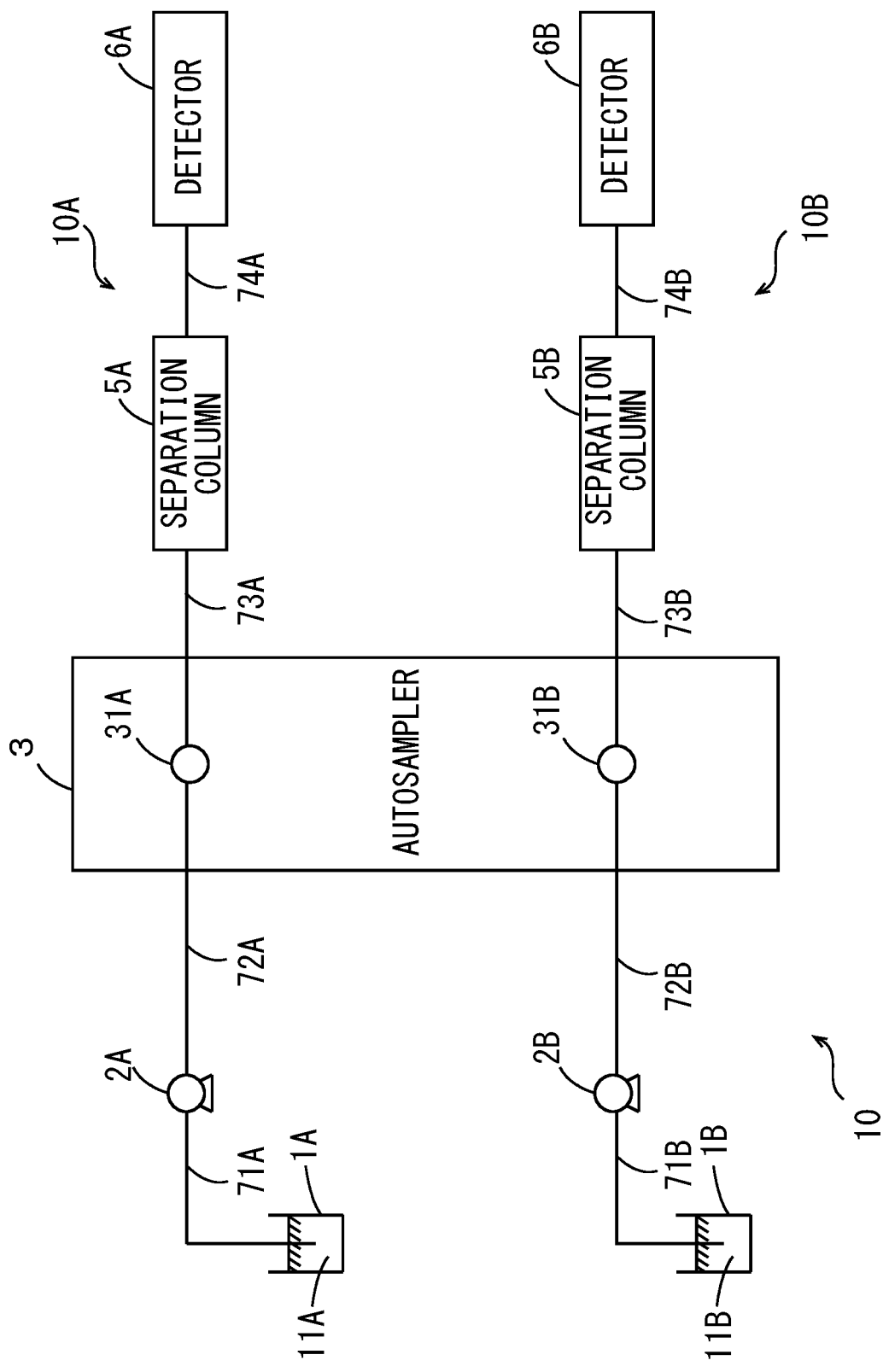
FIG. 1 is an overview of a liquid chromatograph according to embodiments.

FIG. 1 is an overview of the configuration of the liquid chromatograph 10 according to the present embodiment. The liquid chromatograph 10 includes two analysis flow paths 10A, 10B. The analysis flow path 10A includes an eluent tank 1A, a pump 2A, an autosampler 3, a separation column 5A and a detector 6A. The analysis flow path 10B includes an eluent tank 1B, a pump 2B, the autosampler 3, a separation column 5B and a detector 6B. The analysis flow path 10A and the analysis flow path 10B share the autosampler 3.

In the eluent tank 1A, an eluent 11A which is a mobile phase is contained. In the eluent tank 1B, an eluent 11B which is a mobile phase is contained. One end of a flow path tube 71A is connected to the eluent tank 1A. The other end of the flow path tube 71A is connected to the pump 2A. The pump 2A is driven, so that the eluent 11A in the eluent tank 1A is sent to a flow path tube 72A located at a position farther downstream than the pump 2A through the flow path tube 71A. One end of a flow path tube 71B is connected to the eluent tank 1B. The other end of the flow path tube 71B is connected to the pump 2B. The pump 2B is driven, so that the eluent 11B in the eluent tank 1B is sent to the flow path tube 72B located at a position farther downstream than the pump 2B through the flow path tube 71B.

The eluent 11A that has been sent from the pump 2A is supplied to the autosampler 3 through the flow path tube 72A. The eluent 11B that has been sent from the pump 2B is supplied to the autosampler 3 through the flow path tube 72B. The autosampler 3 includes a high pressure valve 31A and a high pressure valve 31B. A flow path tube 73A is connected to the high pressure valve 31A. A flow path tube 73B is connected to the high pressure valve 31B. The configuration of the autosampler 3 will be described below in detail.

A sample is injected into the eluent 11A, that has been supplied to the autosampler 3, through the high pressure valve 31A. The eluent 11A into which the sample has been injected flows to the separation column 5A through the flow path tube 73A. A sample is injected into the eluent 11B, that has been supplied to the autosampler 3, through the high pressure valve 31B. The eluent 11B into which the sample has been injected flows to the separation column 5B through the flow path tube 73B.

The sample is separated while the eluent 11A passes through a stationary phase in the separation column 5A. The sample is separated while the eluent 11B passes through a stationary phase in the separation column 5B. The eluent 11A in which the sample is dissolved is sent to the detector 6A through a flow path tube 74A. The eluent 11B that has flowed out from the separation column 5B and in which the sample is dissolved is sent to the detector 6B through a flow path tube 74B.

The eluents 11A, 11B in which the samples are respectively separated in the separation columns 5A, 5B are respectively supplied to the detectors 6A, 6B. As the detectors 6A, 6B, a spectrophotometric detector, a fluorescence detector, an electrical conductance detector, an electrochemical detector or the like is used, for example.

(2) Configuration of Autosampler

Figure 2:
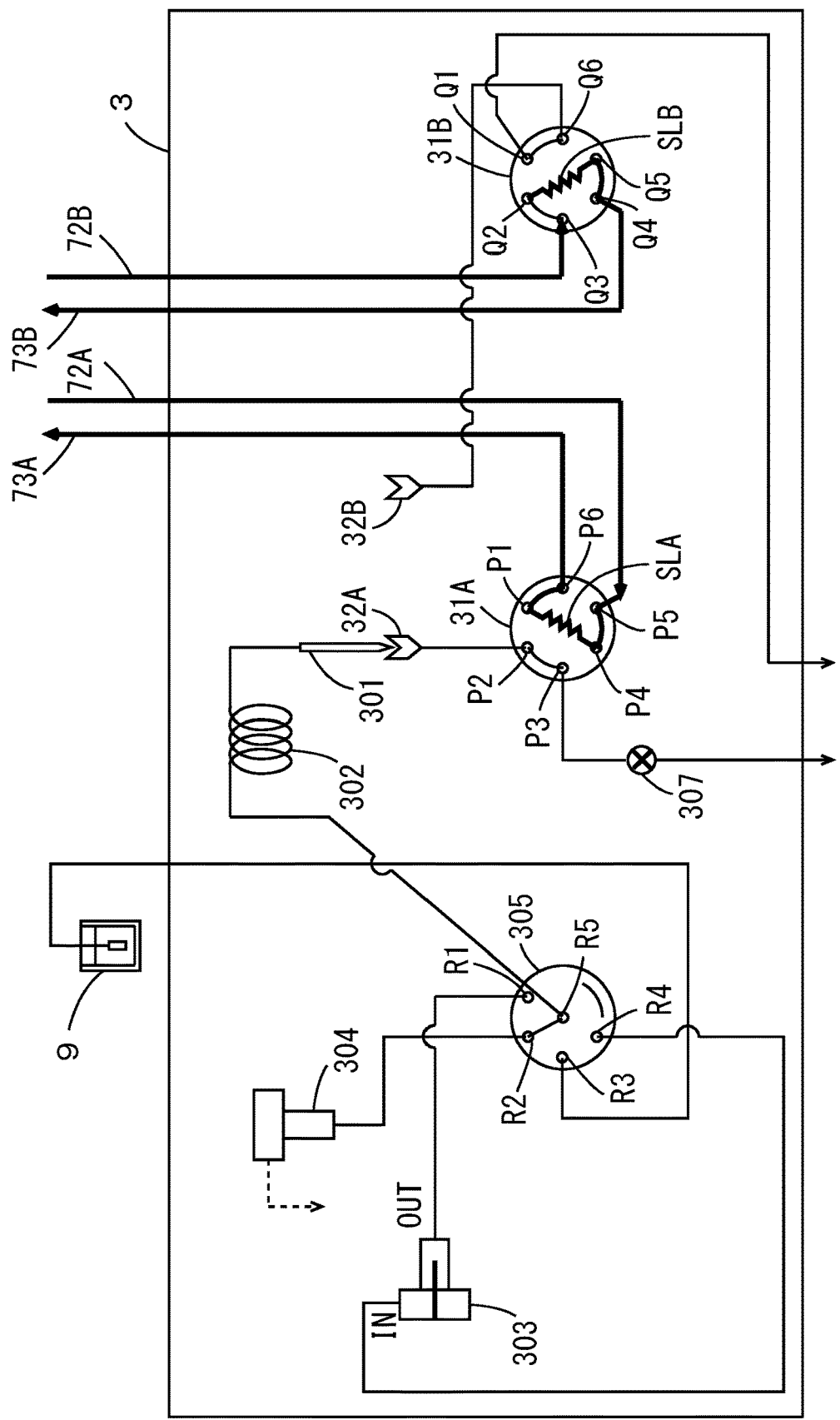
FIG. 2 is a diagram showing an autosampler according to a first embodiment.

The configuration of the autosampler 3 according to the first embodiment will be described next with reference to FIG. 2. As shown in FIG. 2, the autosampler 3 includes the high pressure valve 31A, the high pressure valve 31B and a low pressure valve 305. Further, the autosampler 3 includes an injection port 32A, an injection port 32B, a needle 301, a needle loop 302, a metering pump 303, a cleaning port 304 and a drain valve 307. The high pressure valve 31A is connected to the analysis flow path 10A. The high pressure valve 31B is connected to the analysis flow path 10B. In the autosampler 3 of the first embodiment, a sample is injected into both of the analysis flow path 10A and the analysis flow path 10B by a loop injection system.

The high pressure valve 31A is a six-way two-position switching valve. The high pressure valve 31A includes six peripheral ports P1 to P6. The injection port 32A is connected to the port P2. The port P3 is connected to the drain valve 307. The port P5 is connected to the flow path tube 72A. The port P6 is connected to the flow path tube 73A. That is, the eluent 11A that has been sent from the pump 2A is supplied to the port P5 through the flow path tube 72A. The eluent 11A that has flowed out from the port P6 is supplied to the separation column 5A through the flow path tube 73A. Further, a sample loop SLA is provided between the port P1 and the port P4.

As shown in FIG. 2, the high pressure valve 31A includes three connection flow paths that connects adjacent peripheral ports to each other. The three connection flow paths are switched between first and second positions by rotation. When the high pressure valve 31A is switched to the first position, the port P1 and the port P2 are connected to each other, the port P3 and the port P4 are connected to each other, and the port P5 and the port P6 are connected to each other. When the high pressure valve 31A is switched to the second position, the port P2 and the port P3 are connected to each other, the port P4 and the port P5 are connected to each other, and the port P6 and the port P1 are connected to each other.

The high pressure valve 31B is a six-way two-position switching valve. The high pressure valve 31B includes six peripheral ports Q1 to Q6. The injection port 32B is connected to the port Q6. The port Q1 is connected to a drainage path. The port Q3 is connected to the flow path tube 72B. The port Q4 is connected to the flow path tube 73B. That is, the eluent 11B that has been sent from the pump 2B is supplied to the port Q3 through the flow path tube 72B. The eluent 11B that has flowed out from the port Q4 is supplied to the separation column 5B through the flow path tube 73B. Further, a sample loop SLB is provided between the port Q2 and the port Q5.

As shown in FIG. 2, the high pressure valve 31B includes three connection flow paths that connects adjacent peripheral ports to each other. The three connection flow paths are switched between first and second positions by rotation. When the high pressure valve 31B is switched to the first position, the ports Q1 and the port Q2 are connected to each other, the port Q3 and the port Q4 are connected to each other, and the port Q5 and the port Q6 are connected to each other. When the high pressure valve 31B is switched to the second position, the ports Q2 and the port Q3 are connected to each other, the port Q4 and the port Q5 are connected to each other, and the port Q6 and the port Q1 are connected to each other.

The low pressure valve 305 is a six-position rotary valve. The low pressure valve 305 includes four peripheral ports R1 to R4 and a common port R5. An OUT port of the metering pump 303 is connected to the port R1. A cleaning port 304 is connected to the port R2. A cleaning liquid tank 9 is connected to the port R3. The cleaning liquid tank 9 is arranged outside of the autosampler 3. An IN port of the metering pump 303 is connected to the port R4. The needle 301 is connected to the port R5. The needle loop 302 is provided in a flow path tube that connects the port R5 and the needle 301 to each other.

As shown in FIG. 2, the low pressure valve 305 includes one connection flow path that connects adjacent peripheral ports to each other and one connection flow path that connects the common port R5 and a peripheral port to each other. These two connection flow paths are switched among first to six positions by rotation while maintaining the positional relationship shown in the diagram.

When the low pressure valve 305 is switched to the first position, the port R1 and the port R5 are connected to each other. When the low pressure valve 305 is switched to the second position, the port R2 and the port R5 are connected to each other. When the low pressure valve 305 is switched to the third position, the port R3 and the port R5 are connected to each other. When the low pressure valve 305 is switched to the fourth position, the port R4 and the port R5 are connected to each other. When the low pressure valve 305 is switched to the fifth position, the port R1 and the port R2 are connected to each other. When the low pressure valve 305 is switched to the sixth position, the port R3 and the port R4 are connected to each other.

When a cleaning liquid in the cleaning liquid tank 9 is supplied to the cleaning port 304, the low pressure valve 305 is switched to the sixth position, and the port R3 and the port R4 are connected to each other. Then, the metering pump 303 performs a sucking operation, so that the cleaning liquid in the cleaning liquid tank 9 is sucked by the metering pump 303. Subsequently, the low pressure valve 305 is switched to the fifth position, so that the port R1 and the port R2 are connected to each other. Then, the metering pump 303 performs a discharging operation, so that the cleaning liquid is supplied into the cleaning port 304. Thereafter, the needle 301 is inserted into the cleaning port 304, so that the needle 301 is cleaned.

(3) Operation of Autosampler

Figure 3:
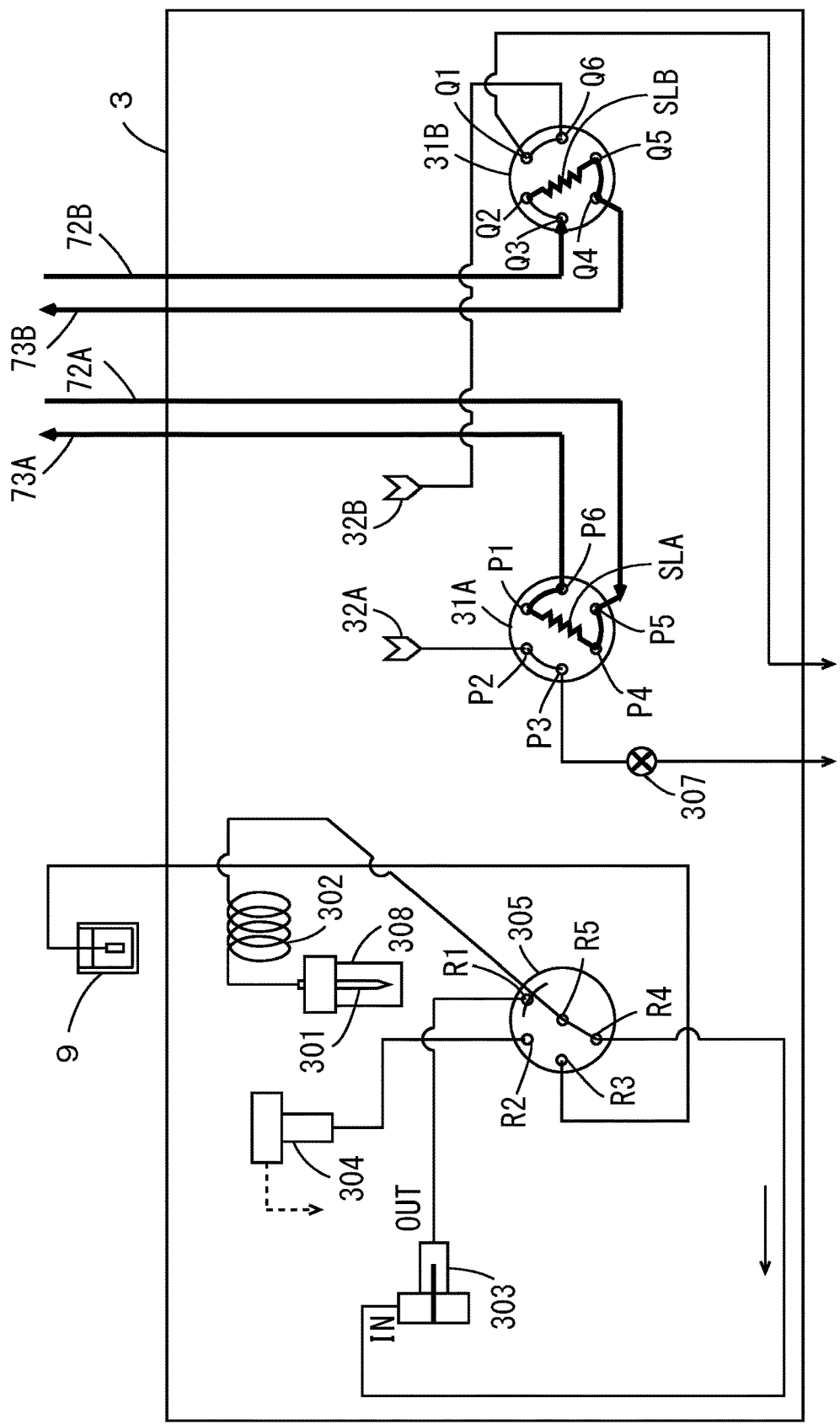
FIG. 3 is a diagram showing the operation of the autosampler according to the first embodiment.

The operation of the autosampler 3 according to the first embodiment will be described next with reference to FIGS. 3 to 6. FIG. 3 is a diagram showing an operation of the autosampler 3 and is a diagram showing the operation of sucking a sample.

As shown in FIG. 3, the high pressure valve 31A is switched to the second position, the port P2 and the port P3 are connected to each other, the port P4 and the port P5 are connected to each other, and the port P6 and the port P1 are connected to each other. Thus, the flow path tube 72A is connected to the flow path tube 73A through the sample loop SLA. The eluent 11A that has been sent from the pump 2A flows to the separation column 5A through the flow path tube 72A, the sample loop SLA and the flow path tube 73A. Since a sample is not stored in the sample loop SLA at this point in time, only the eluent 11A flows to the separation column 5A.

As shown in FIG. 3, the high pressure valve 31B is switched to the second position, the port Q2 and the port Q3 are connected to each other, the port Q4 and the port Q5 are connected to each other, and the port Q6 and the port Q1 are connected to each other. Thus, the flow path tube 72B is connected to the flow path tube 73B through the sample loop SLB. The eluent 11B that has been sent from the pump 2B flows to the separation column 5B through the flow path tube 72B, the sample loop SLB and the flow path tube 73B. Since a sample is not stored in the sample loop SLB at this point in time, only the eluent 11B flows to the separation column 5B.

As shown in FIG. 3, the needle 301 is moved to be inserted into a vial 308. Further, the low pressure valve 305 is switched to the fourth position, and the port R5 and the port R4 are connected to each other. Thus, the needle 301 is connected to the IN port of the metering pump 303. In this state, the metering pump 303 performs a sucking operation, so that a sample in the vial 308 is stored in the needle loop 302. At this time, the metering pump 303 is controlled, so that a predetermined required amount of sample is stored in the needle loop 302. In the embodiment, a sample to be supplied to both of the sample loop SLA of the analysis flow path 10A and the sample loop SLB of the analysis flow path 10B is stored in the needle loop 302.

Figure 4:
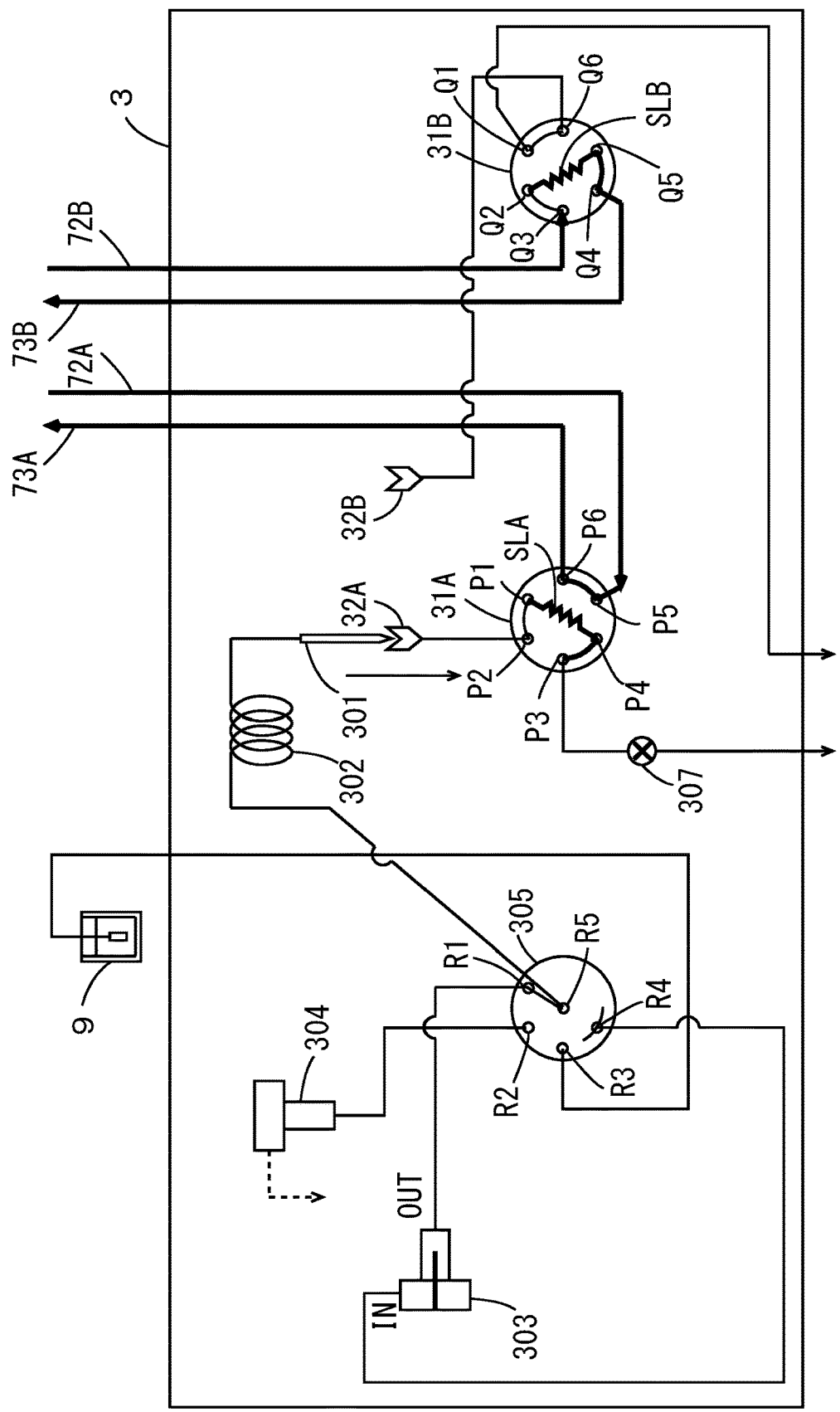
FIG. 4 is a diagram showing the operation of the autosampler according to the first embodiment.

FIG. 4 is a diagram showing an operation of the autosampler 3 and is a diagram showing the operation of injecting a sample. As shown in FIG. 4, the high pressure valve 31A is switched to the first position, the port P1 and the port P2 are connected to each other, the port P3 and the port P4 are connected to each other, and the port P5 and the port P6 are connected to each other. Thus, the flow path tube 72A is connected to the flow path tube 73A through the ports P5, P6. Further, the injection port 32A is connected to the drain valve 307 through the sample loop SLA.

As shown in FIG. 4, the needle 301 is moved to be inserted into the injection port 32A. Further, the low pressure valve 305 is switched to the first position, and the port R5 and the port R1 are connected to each other. Thus, the needle 301 is connected to the OUT port of the metering pump 303. In this state, the drain valve 307 is opened, and the metering pump 303 performs a discharging operation. Thus, the sample in the needle loop 302 is stored in the sample loop SLA through the injection port 32A. At this time, the metering pump 303 is controlled, so that only a predetermined amount of sample to be supplied to the analysis flow path 10A of the sample stored in the needle loop 302 is supplied to the sample loop SLA. The high pressure valve 31B is not changed from the state shown in FIG. 3. That is, the eluent 11B that has been sent from the pump 2B flows to the separation column 5B through the flow path tube 72B, the sample loop SLB and the flow path tube 73B.

Figure 5:
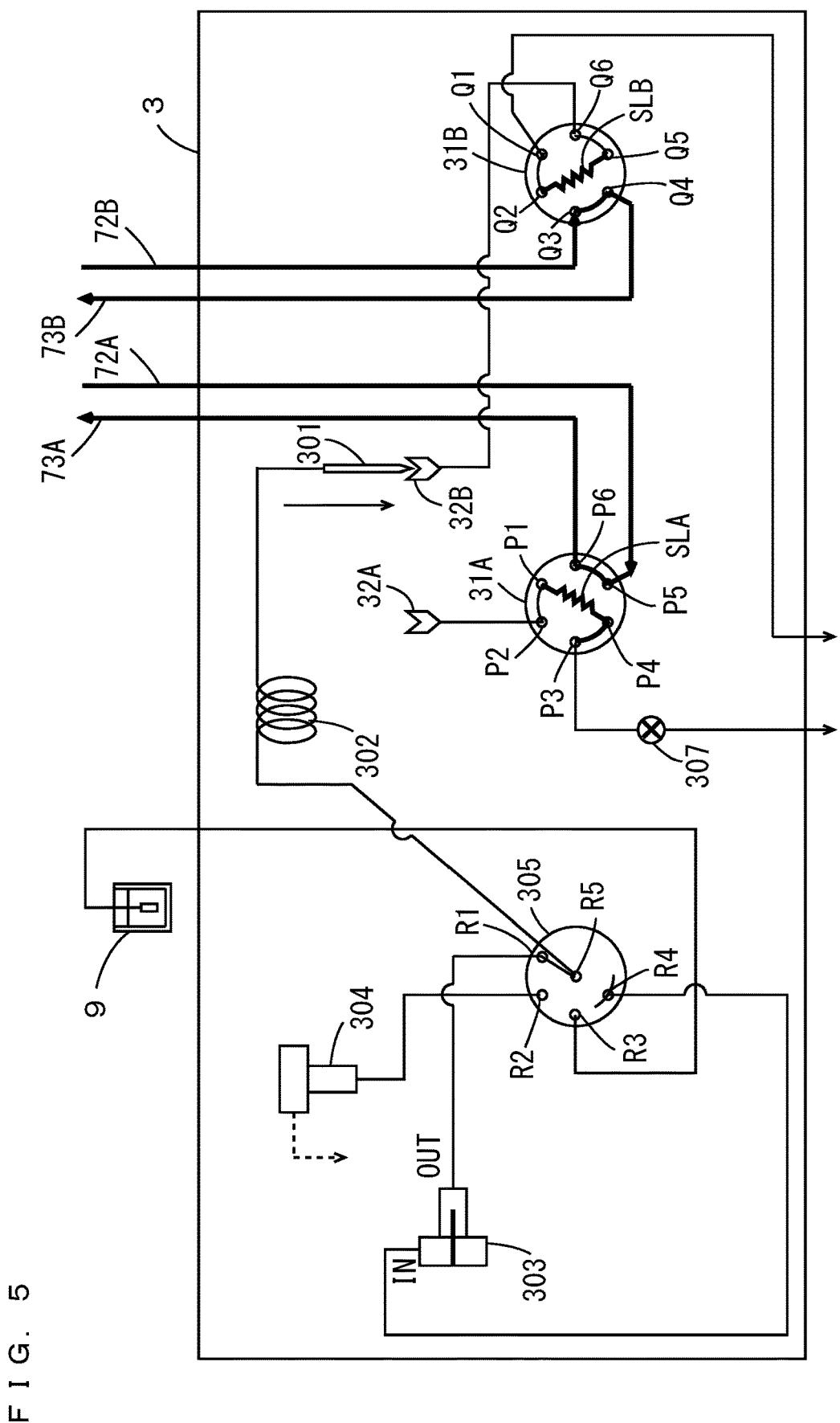
FIG. 5 is a diagram showing the operation of the autosampler according to the first embodiment.

FIG. 5 is a diagram showing an operation of the autosampler 3 and is a diagram showing the operation of injecting a sample. As shown in FIG. 5, the high pressure valve 31B is switched to the first position, the port Q1 and the port Q2 are connected to each other, the port Q3 and the port Q4 are connected to each other, and the port Q5 and the port Q6 are connected to each other. Thus, the flow path tube 72B is connected to the flow path tube 73B through the ports P3, P4. Further, the injection port 32B is connected to the drainage path through the sample loop SLB.

As shown in FIG. 5, the drain valve 307 is closed such that the sample stored in the sample loop SLA does not flow out, and the needle 301 is moved to be inserted into the injection port 32B. The low pressure valve 305 maintains the first position similarly to the state of FIG. 4, and the port R5 and the port R1 are connected to each other. Continuing from the state of FIG. 4, the needle 301 is connected to the OUT port of the metering pump 303. In this state, the metering pump 303 performs a discharging operation, so that the sample in the needle loop 302 is stored in the sample loop SLB through the injection port 32B.

The high pressure valve 31A is not changed from the state of FIG. 4. That is, the eluent 11A that has been sent from the pump 2A flows to the separation column 5A through the flow path tube 72B, the ports P5, P6 and the flow path tube 73A. The drain valve 307 is closed, and the sample is kept being stored in the sample loop SLA.

Further, although one end of the sample loop SLB is connected to the drainage path through the port Q1, the other end of the sample loop SLB is connected to the metering pump 303 through the port Q6 and sealed by the port R4 of the low pressure valve 305. Therefore, the sample is also kept being stored in the sample loop SLB.

With the above-mentioned operation, the sample is being stored in both of the sample loop SLA and the sample loop SLB. Further, the eluent 11A that has been sent from the pump 2A is flowing to the separation column 5A through the flow path tube 72A, the ports P5, P6 and the flow path tube 73A, and the eluent 11B that has been sent from the pump 2B is flowing to the separation column 5B through the flow path tube 72B, the ports Q3, Q4 and the flow path tube 73B.

Figure 6:
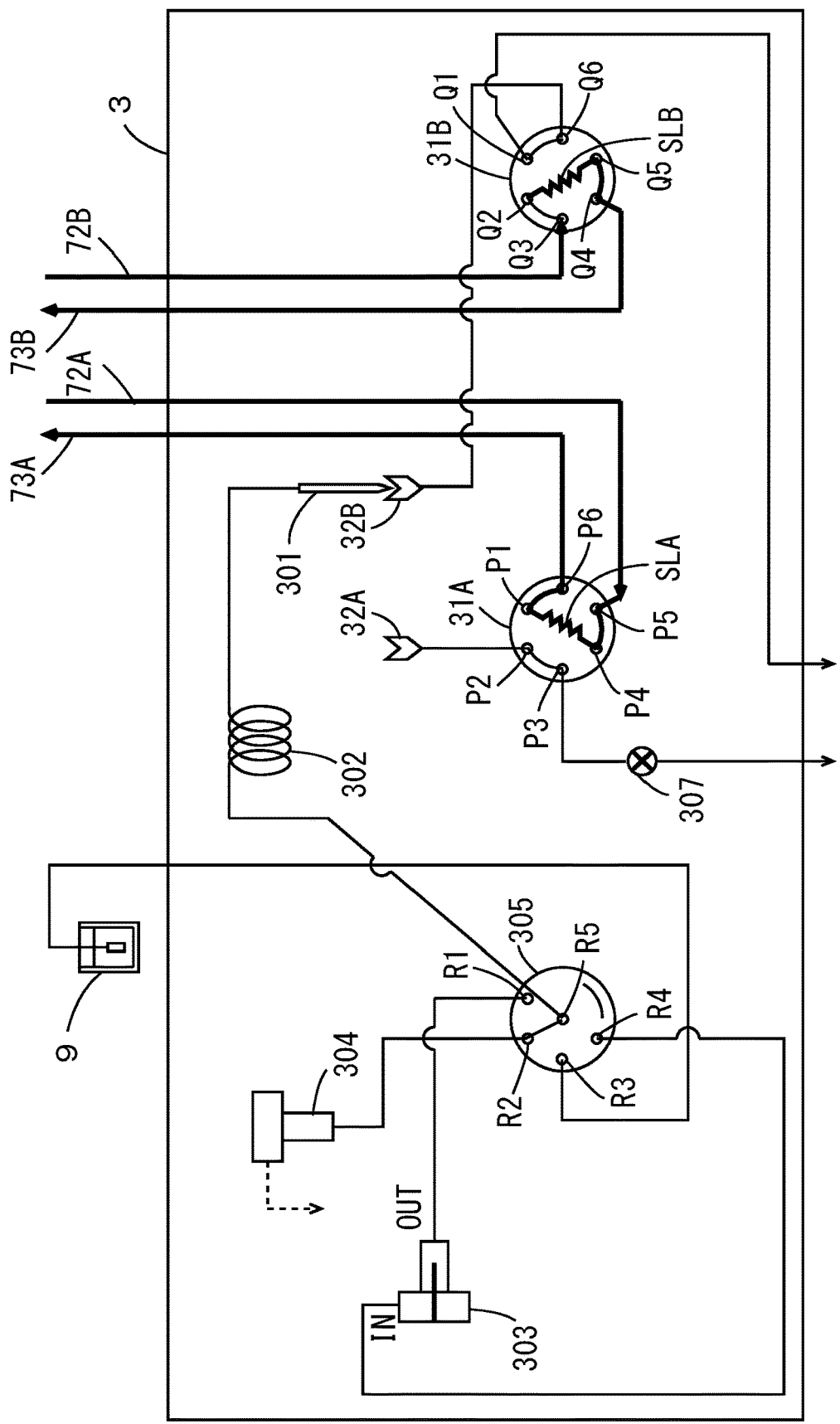
FIG. 6 is a diagram showing the operation of the autosampler according to the first embodiment.

FIG. 6 is a diagram showing an operation of the autosampler 3 and is a diagram showing the operation of performing an analysis process. As shown in FIG. 6, the high pressure valve 31A is switched to the second position, the port P2 and the port P3 are connected to each other, the port P4 and the port P5 are connected to each other, and the port P6 and the port P1 are connected to each other. The high pressure valve 31B is switched to the second position, the port Q2 and the port Q3 are connected to each other, the port Q4 and the port Q5 are connected to each other, and the port Q6 and the port Q1 are connected to each other.

Thus, the flow path tube 72A is connected to the flow path tube 73 through the sample loop SLA. Further, the flow path tube 72B is connected to the flow path tube 73B through the sample loop SLB. A sample in the sample loop SLA is mixed with the eluent 11A supplied through the flow path tube 72A. The eluent 11A mixed with the sample is supplied to the separation column 5A through the flow path tube 73A. Further, a sample in the sample loop SLB is mixed with the eluent 11B supplied through the flow path tube 72B. The eluent 11B mixed with the sample is supplied to the separation column 5B through the flow path tube 73B. The samples separated in the separation columns 5A, 5B are respectively detected in the detectors 6A, 6B.

In this manner, with the liquid chromatograph 10 of the first embodiment, analysis processes are synchronously executed in both of the analysis flow path 10A to which the sample loop SLA is connected and the analysis flow path 10B to which the sample loop SLB is connected. That is, as shown in FIG. 6, both of the high pressure valve 31A and the high pressure valve 31B are switched to the second position, whereby the sample loop SLA is connected to the analysis flow path 10A, and the sample loop SLB is connected to the analysis flow path 10B. A point in time at which the high pressure valve 31A is switched to the second position is synchronized with a point in time at which the high pressure valve 31B is switched to the second position, whereby the analysis processes to be executed in the analysis flow path 10A and the analysis flow path 10B can be synchronized. The high pressure valve 31A and the high pressure valve 31B are switched to the second position at the same time, so that the analysis processes can be started in the analysis flow path 10A and the analysis flow path 10B at the same time.

The liquid chromatograph 10 of the first embodiment is used, so that a plurality of types of analysis processes can be synchronously executed with respect to the same sample. For example, even in a case where the state of a sample changes over time, a plurality of types of analysis processes can be executed under the same condition.

[2] Second Embodiment

A second embodiment of the present invention will be described next. Also in the second embodiment, the overall configuration of a liquid chromatograph 10 is similar to the configuration shown in FIG. 1. In the second embodiment, only the configuration of an autosampler 3 in the liquid chromatograph 10 is different.

(1) Configuration of Autosampler

Figure 7:
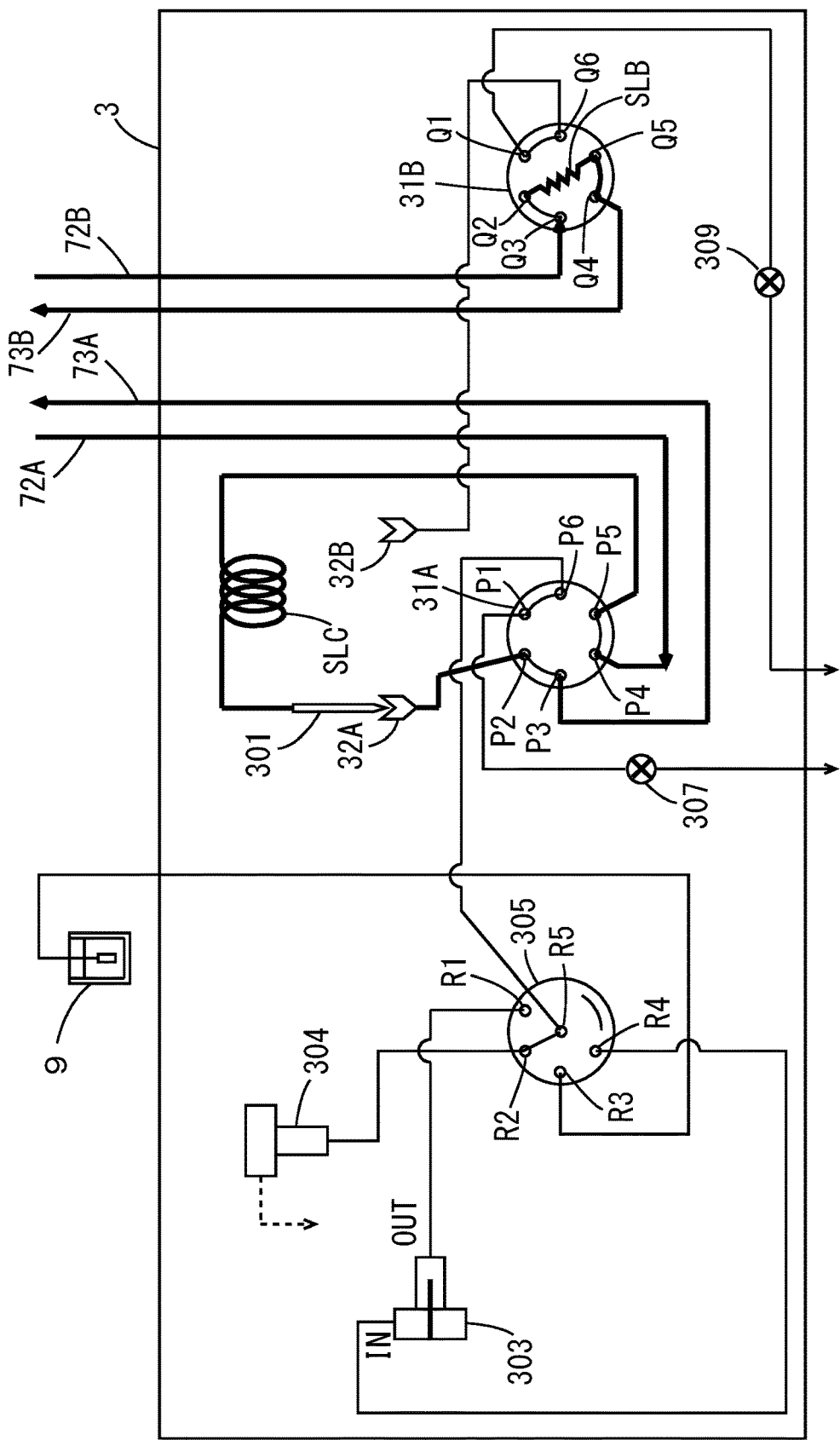
FIG. 7 is a diagram showing an autosampler according to a second embodiment.

The configuration of the autosampler 3 according to the second embodiment will be described next with reference to FIG. 7. As shown in FIG. 7, the autosampler 3 includes a high pressure valve 31A, a high pressure valve 31B and a low pressure valve 305. The autosampler 3 further includes an injection port 32A, an injection port 32B, a needle 301, a sample loop SLC, a metering pump 303, a cleaning port 304, a drain valve 307 and a drain valve 309. The high pressure valve 31A is connected to the analysis flow path 10A. The high pressure valve 31B is connected to the analysis flow path 10B. In the autosampler 3 in the second embodiment, a sample is injected into the analysis flow path 10A by a total volume injection system. A sample is injected into the analysis flow path 10B by a loop injection system.

The high pressure valve 31A is a six-way two-position switching valve. The high pressure valve 31A includes six peripheral ports P1 to P6. The port P1 is connected to the drain valve 307. The port P2 is connected to the injection port 32A. The port P3 is connected to a flow path tube 73A. The port P4 is connected to a flow path tube 72A. The port P5 is connected to the needle 301. The port P6 is connected to a common port R5 of the low pressure valve 305. Differently from the high pressure valve 31A of the first embodiment, a sample loop SLA is not provided between the port P1 and the port P4 in the high pressure valve 31A of the second embodiment. In the second embodiment, a sample loop SLC is arranged between the needle 301 and the port P5.

When the high pressure valve 31A is switched to a first position, the port P1 and the port P2 are connected to each other, the port P3 and the port P4 are connected to each other, and the port P5 and the port P6 are connected to each other. When the high pressure valve 31A is switched to the second position, the port P2 and the port P3 are connected to each other, the port P4 and the port P5 are connected to each other, and the port P6 and the port P1 are connected to each other.

The high pressure valve 31B is a six-way two-position switching valve. The high pressure valve 31B includes six peripheral ports Q1 to Q6. The port Q1 is connected to the drain valve 309. The port Q3 is connected to a flow path tube 72B. The port Q4 is connected to a flow path tube 73B. The port Q6 is connected to the injection port 32B. Similarly to the high pressure valve 31B of the first embodiment, a sample loop SLB is provided between the port Q2 and the port Q5.

When the high pressure valve 31B is switched to a first position, the port Q1 and the port Q2 are connected to each other, the port Q3 and the port Q4 are connected to each other, and the port Q5 and the port Q6 are connected to each other. When the high pressure valve 31B is switched to the second position, the port Q2 and the port Q3 are connected to each other, the port Q4 and the port Q5 are connected to each other, and the port Q6 and the port Q1 are connected to each other.

The low pressure valve 305 in the second embodiment is similar to the first embodiment. Similarly to the first embodiment, the metering pump 303 operates, a process of sucking a cleaning liquid from the cleaning liquid tank is performed, and a process of supplying a cleaning liquid to the cleaning port 304 is performed.

(2) Operation of Autosampler

Figure 8:
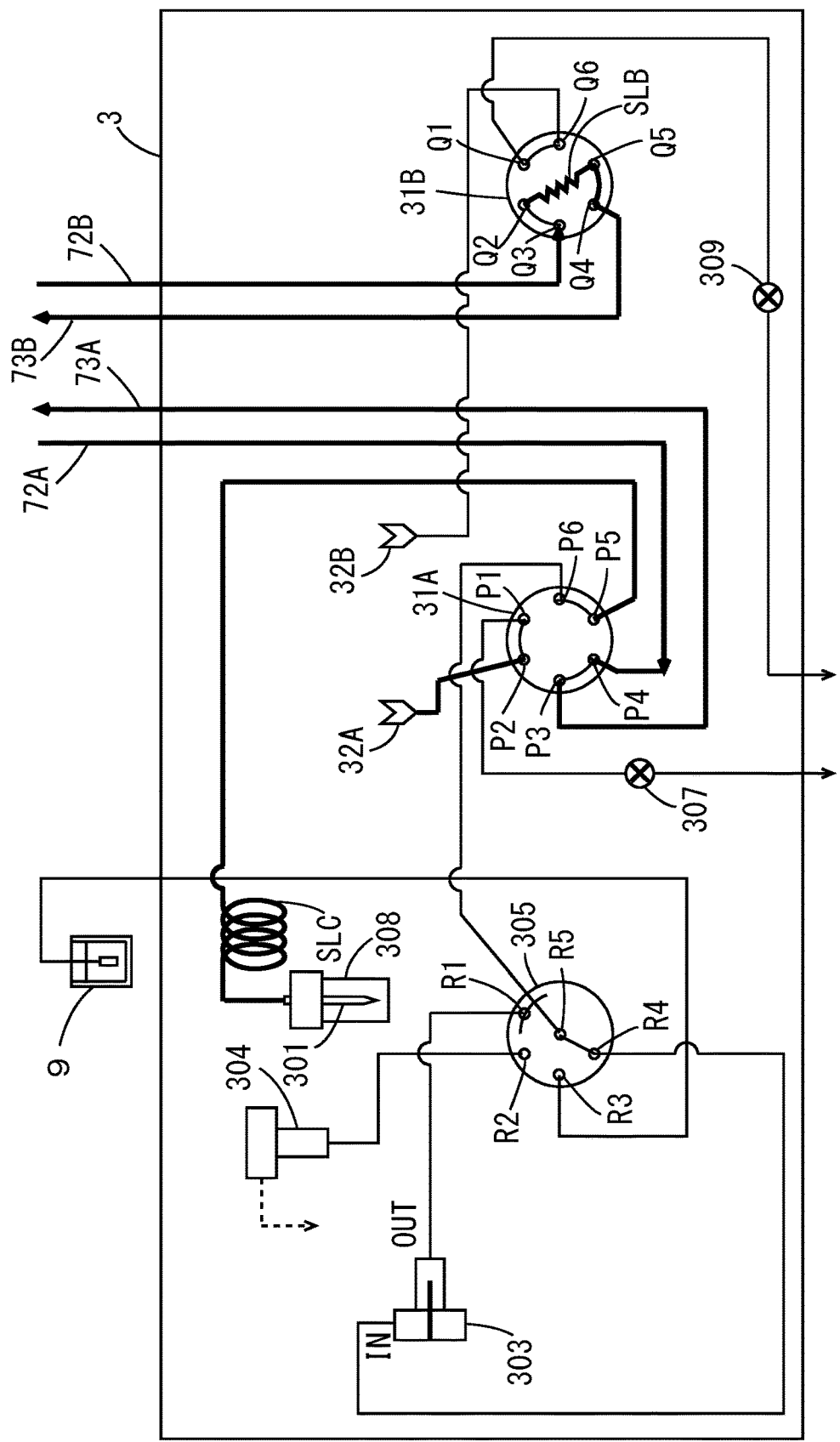
FIG. 8 is a diagram showing the operation of the autosampler according to the second embodiment.

The operation of the autosampler 3 according to the second embodiment will be described next with reference to FIGS. 8 to 11. FIG. 8 is a diagram showing the operation of the autosampler 3 and is a diagram showing the operation of sucking a sample.

As shown in FIG. 8, the high pressure valve 31A is switched to the first position, the port P1 and the port P2 are connected to each other, the port P3 and the port P4 are connected to each other, and the port P5 and the port P6 are connected to each other. Further, the low pressure valve 305 is switched to the fourth position, and the port R5 and the port R4 are connected to each other. Thus, the needle 301 is connected to the metering pump 303 through the ports P5, P6 of the high pressure valve 31A and the ports R5, R4 of the low pressure valve 305. The flow path tube 72A is connected to the flow path tube 73A through the ports P4, P3. An eluent 11A that has been sent from a pump 2A flows to a separation column 5A through the flow path tube 72A, the ports P4, P3 and the flow path tube 73A.

As shown in FIG. 8, the high pressure valve 31B maintains the second position, the port Q2 and the port Q3 are connected to each other, the port Q4 and the port Q5 are connected to each other, and the port Q6 and the port Q1 are connected to each other. Thus, the flow path tube 72B is connected to the flow path tube 73B through the sample loop SLB. The eluent 11B that has been sent from the pump 2B flows to a separation column 5B through the flow path tube 72B, the sample loop SLB and the flow path tube 73B. Since a sample is not stored in the sample loop SLB at this point in time, only the eluent 11B flows to the separation column 5B.

As shown in FIG. 8, the needle 301 is moved to be inserted into a vial 308. In this state, the metering pump 303 performs a sucking operation, so that a sample in the vial 308 is stored in the sample loop SLC. At this time, the metering pump 303 is controlled, so that a predetermined required amount of sample is stored in the sample loop SLC. In the embodiment, the sample to be supplied to both of the sample loop SLC of the analysis flow path 10A and the sample loop SLB of the analysis flow path 10B is stored in the sample loop SLC.

Figure 9:
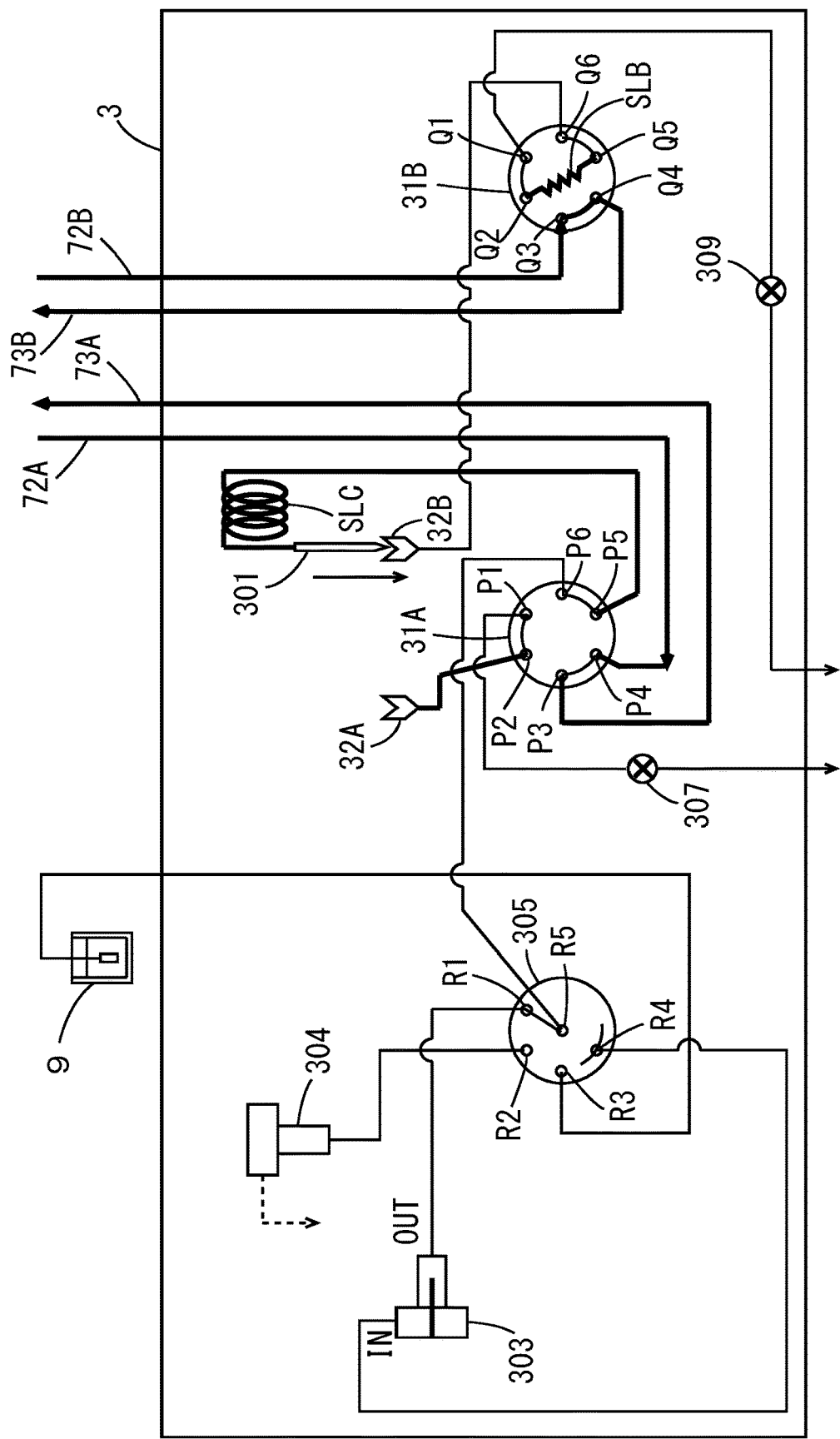
FIG. 9 is a diagram showing the operation of the autosampler according to the second embodiment.

FIG. 9 is a diagram showing an operation of the autosampler 3 and is a diagram showing the operation of injecting a sample. As shown in FIG. 9, the high pressure valve 31B is switched to the first position, the port Q1 and the port Q2 are connected to each other, the port Q3 and the port Q4 are connected to each other, and the port Q5 and the port Q6 are connected to each other. Thus, the flow path tube 72B is connected to the flow path tube 73B through the ports Q3, Q4. Further, the injection port 32B is connected to the drain valve 309 through the sample loop SLB.

As shown in FIG. 9, the needle 301 is moved to be inserted into the injection port 32B. Further, the low pressure valve 305 is switched to the first position, and the port R5 and the port R1 are connected to each other. Thus, the needle 301 is connected to the OUT port of the metering pump 303. In this state, the metering pump 303 performs a discharging operation, so that a sample in the sample loop SLC is stored in the sample loop SLB through the injection port 32B. At this time, the metering pump 303 is controlled, so that only a predetermined amount of sample to be supplied to the analysis flow path 10B of the sample stored in the sample loop SLC is supplied to the sample loop SLB. The drain valve 309 is closed, so that the sample is kept being stored in the sample loop SLB. The high pressure valve 31A is not changed from the state of FIG. 8. That is, the eluent 11A that has been sent from the pump 2A flows to the separation column 5A through the flow path tube 72A, the ports P4, P3 and the flow path tube 73A.

Figure 10:
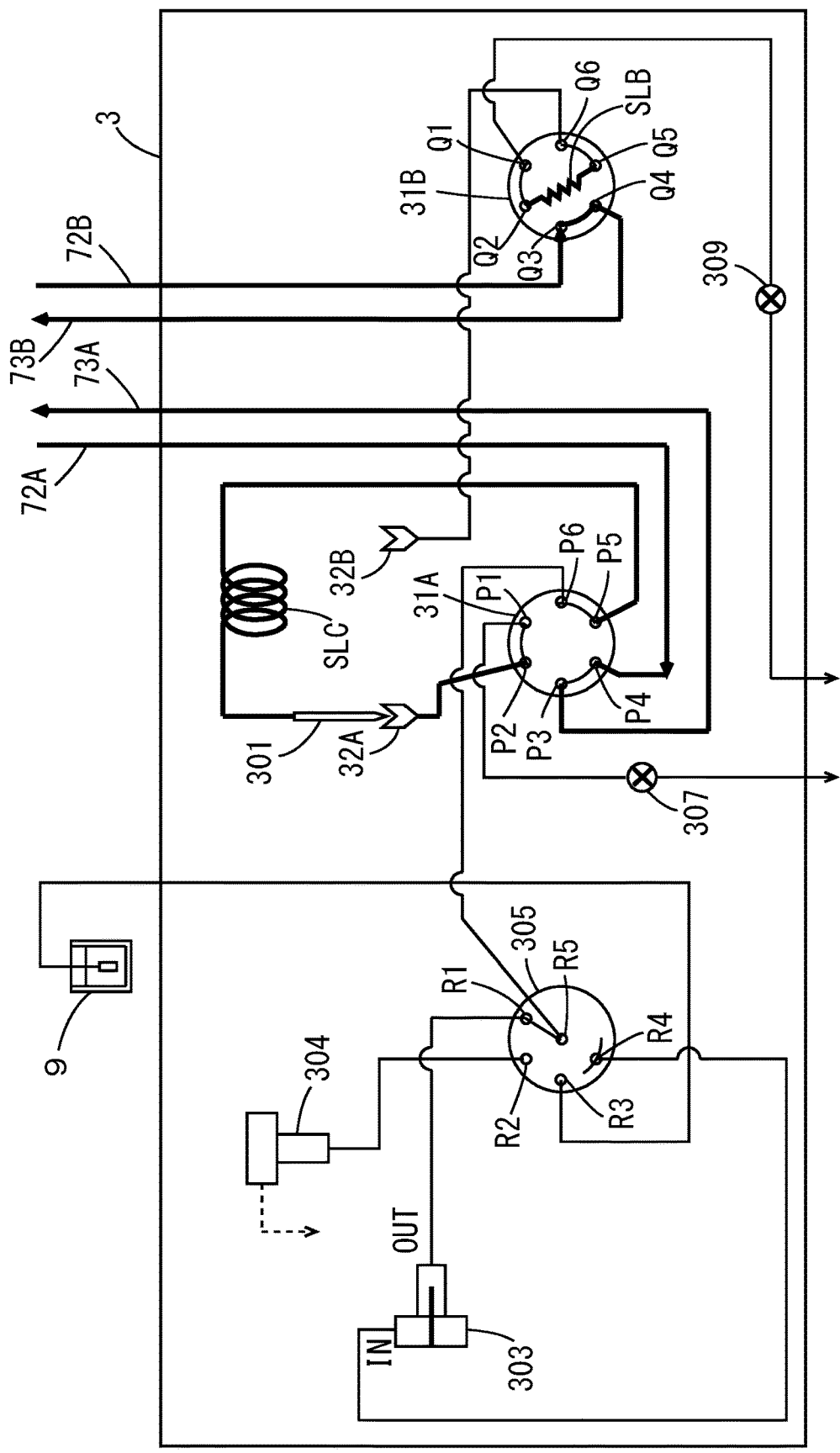

FIG. 10 is a diagram showing an operation of the autosampler 3 and is a diagram showing the operation of injecting a sample. As shown in FIG. 10, the high pressure valve 31A and the high pressure valve 31B maintain the first position that is the same as the state of FIG. 9. The low pressure valve 305 maintains the first position that is the same as the state of FIG. 9.

As shown in FIG. 10, the needle 301 is moved to be inserted into the injection port 32A. Continuing form the state of FIG. 9, the needle 301 is connected to the OUT port of the metering pump 303. In this state, the drain valve 307 is closed, so that the sample in the sample loop SLC is kept being stored in the sample loop SLC. The eluent 11A that has been sent from the pump 2A flows to the separation column 5A through the flow path tube 72A, the ports P4, P3 and the flow path tube 73A.

With the above-mentioned operation, the sample is being stored in both of the sample loop SLC and the sample loop SLB. Further, the eluent 11A that has been sent from the pump 2A flows to the separation column 5A through the flow path tube 72A, the ports P4, P3 and the flow path tube 73A, and the eluent 11B that has been sent from the pump 2B flows to the separation column 5B through the flow path tube 72B, the ports Q3, Q4 and the flow path tube 73B.

Figure 11:
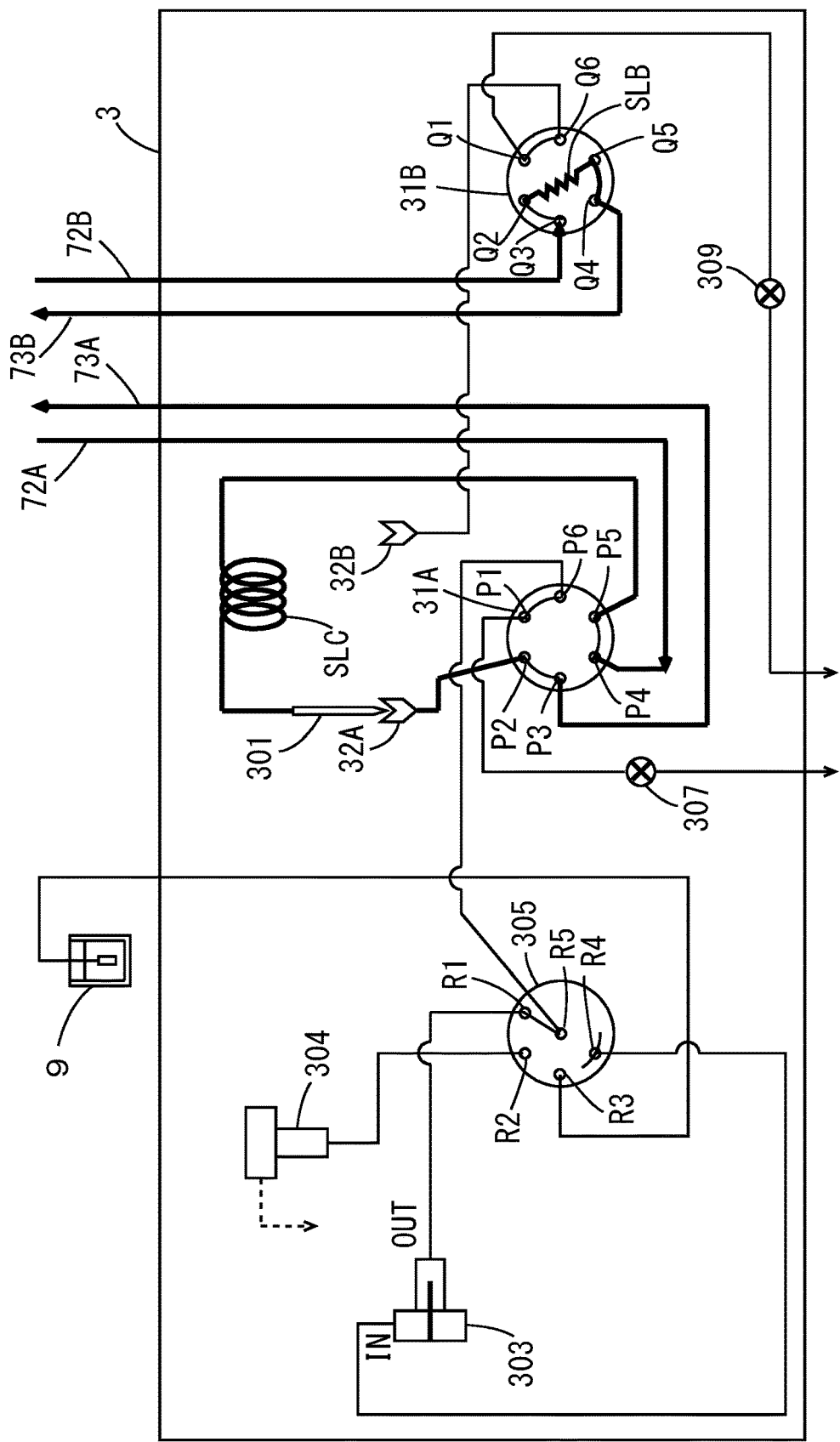
FIG. 11 is a diagram showing the operation of the autosampler according to the second embodiment.

FIG. 11 is a diagram showing an operation of the autosampler and is a diagram showing the operation of performing an analysis process. As shown in FIG. 11, the high pressure valve 31A is switched to the second position, the port P2 and the port P3 are connected to each other, the port P4 and the port P5 are connected to each other, and the port P6 and the port P1 are connected to each other. The high pressure valve 31B is switched to the second position, the port Q2 and the port Q3 are connected to each other, the port Q4 and the port Q5 are connected to each other, and the port Q6 and the port Q1 are connected to each other.

Thus, the flow path tube 72A is connected to the flow path tube 73A through the sample loop SLC. Further, the flow path tube 72B is connected to the flow path tube 73B through the sample loop SLB. A sample in the sample loop SLC is mixed with the eluent 11A supplied through the flow path tube 72A. The eluent 11A mixed with the sample is supplied to the separation column 5A through the flow path tube 73A. Further, a sample in the sample loop SLB is mixed with the eluent 11B supplied through the flow path tube 72B. The eluent 11B mixed with the sample is supplied to the separation column 5B through the flow path tube 73B. The samples separated in the separation columns 5A, 5B are respectively detected in the detectors 6A, 6B.

In this manner, with the liquid chromatograph 10 of the second embodiment, analysis processes are synchronously executed in both of the analysis flow path 10A to which the sample loop SLC is connected and the analysis flow path 10B to which the sample loop SLB is connected. That is, as shown in FIG. 11, both of the high pressure valve 31A and the high pressure valve 31B are switched to the second position, whereby the sample loop SLC is connected to the analysis flow path 10A, and the sample loop SLB is connected to the analysis flow path 10B. A point in time at which the high pressure valve 31A is switched to the second position is synchronized with a point in time at which the high pressure valve 31B is switched to the second position, whereby the analysis processes to be executed in the analysis flow path 10A and the analysis flow path 10B can be synchronized. The high pressure valve 31A and the high pressure valve 31B are switched to the second position at the same time, so that the analysis processes can be started in the analysis flow path 10A and the analysis flow path 10B at the same time.

[3] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the liquid chromatograph 10 is an example of a chromatograph. Further, in the above-mentioned embodiment, the injection port 32A is an example of a first injection port, and the injection port 32B is an example of a second injection port. Further, in the above-mentioned embodiment, the sample loop SLA or SLC is an example of a first sample loop, and the sample loop SLB is an example of a second sample loop. Further, in the above-mentioned embodiment, the high pressure valve 31A is an example of a first valve, and the high pressure valve 31B is an example of a second valve.

As each of constituent elements recited in the claims, various other elements having configurations or functions described in the claims can be also used.

[4] Other Embodiments

In the first embodiment, a sample to be supplied to the analysis flow path 10A and the analysis flow path 10B is stored in the needle loop 302 by a single operation of the metering pump 303. Then, the sample stored in the needle loop 302 is divided to be supplied to the sample loop SLA and the sample loop SLB. As another operation example, the metering pump 303 may perform the operation twice. First, with the first operation of the metering pump 303, a sample is stored in the needle loop 302, and the stored sample is supplied to the sample loop SLA. Subsequently, with the second operation of the metering pump 303, a sample may be stored in the needle loop 302, and the stored sample may be stored in the sample loop SLB.

In the second embodiment, the sample supplied to the analysis flow path 10A and the analysis flow path 10B is stored in the sample loop SLC by a single operation of the metering pump 303. Then, part of the sample stored in the sample loop SLC is supplied to the sample loop SLB. As another operation example, the metering pump 303 may perform the operation twice. First, with the first operation of the metering pump 303, a sample is stored in the sample loop SLC, and the stored sample is supplied to the sample loop SLB. Subsequently, with the second operation of the metering pump 303, a sample may be stored in the sample loop SLC.

In the first embodiment, a sample is stored in the sample loop SLA, and then a sample is stored in the sample loop SLB. This operation may be reversed. A sample may be stored in the sample loop SLB, and then a sample may be stored in the sample loop SLA.

In the above-mentioned embodiment, the high pressure valve 31B is arranged in the unit of the autosampler 3. The high pressure valve 31B may be arranged outside of the unit of the autosampler 3.

While preferred embodiments of the present invention have been described above, it is to be understood that variations and modifications will be apparent to those skilled in the art without departing the scope and spirit of the present invention. The scope of the present invention, therefore, is to be determined solely by the following claims.

[5] Aspects

It is understood by those skilled in the art that the plurality of above-mentioned illustrative embodiments are specific examples of the below-mentioned aspects.

(Item 1) An autosampler for a chromatograph according to one aspect includes a first injection port through which a sample is injected into a first analysis flow path of the chromatograph, a second injection port through which a sample is injected into a second analysis flow path of the chromatograph, a needle that is movable to both of the first injection port and the second injection port, and injects a sample into the first injection port and the second injection port, a first sample loop that stores a sample to be injected into the first analysis flow path, a second sample loop that stores a sample to be injected into the second analysis flow path, and a metering pump that loads a sample in the first sample loop and the second sample loop.

With the autosampler for a chromatograph of the item 1, a plurality of analysis processes can be executed.

(Item 2) The autosampler for a chromatograph according to item 1 may further include a first valve that switches a connection between the first injection port and the first analysis flow path, and a second valve that switches a connection between the second injection port and the second analysis flow path, wherein the first valve may operate using a loop injection system or a total volume injection system, and the second valve may operate using the loop injection system.

In a case where both of the first valve and the second valve operate using the loop injection system or in a case where one valve operates using the loop injection system and the other valve operates using the total volume injection system, a plurality of analysis processes can be executed.

(Item 3) The autosampler for a chromatograph according to item 2, wherein a sample may be stored in the first sample loop and the second sample loop, and then analysis processes may be synchronously executed in the first analysis flow path and the second analysis flow path by synchronous operations of the first valve and the second valve.

A plurality of analysis processes can be synchronously executed. Because a plurality of analysis processes can be synchronously executed with respect to one sample, a plurality of types of analysis processes can be executed under the same condition even in a case where the state of sample changes over time.

(Item 4) The autosampler for a chromatograph according to item 2, wherein a sample may be stored in the second sample loop by arrangement of the needle in the second injection port, and then the needle may be arranged in the first injection port with a sample stored in the first sample loop, in a case where the first valve operates using the total volume injection system.

In case of the total volume injection system, a sample is first stored in the sample loop that operates using the loop injection system, so that a plurality of analysis processes can be executed.

(Item 5) The autosampler for a chromatograph according to item 2, wherein in a case where the first valve operates using the loop injection system, the first sample loop may be connected to the metering pump by switch of the first valve to a first position and arrangement of the needle in the first injection port, and a sample may be stored in the first sample loop through the first injection port by an operation of the metering pump, the second sample loop may be connected to the metering pump by switch of the second valve to a first position and arrangement of the needle in the second injection port, and a sample may be stored in the second sample loop through the second injection port by an operation of the metering pump, the first sample loop may be connected to the first analysis flow path by switch of the first valve to a second position, and a sample stored in the first sample loop may thus be supplied to the first analysis flow path, and the second sample loop may be connected to the second analysis flow path by switch of the second valve to a second position, and a sample stored in the second sample loop may thus be supplied to the second analysis flow path.

The first valve and the second valve are switched, so that a plurality of analysis processes can be executed.

(Item 6) The autosampler for a chromatograph according to item 2, wherein in a case where the first valve operates using the total volume injection system, with a sample stored in the first sample loop, the second sample loop may be connected to the first sample loop and the metering pump by switch of the second valve to a first position and arrangement of the needle in the second injection port, a sample in the first sample loop may be stored in the second sample loop through the second injection port by an operation of the metering pump, the first valve may be subsequently switched to a first position and the needle may be arranged in the first injection port, the second sample loop may be connected to the second analysis flow path by switch of the second valve to a second position, and a sample stored in the second sample loop may thus be supplied to the second analysis flow path, and the first sample loop may be connected to the first analysis flow path by switch of the first valve to a second position, and a sample stored in the first sample loop may thus be supplied to the first analysis flow path.

The first valve and the second valve are switched, so that a plurality of analysis processes can be executed.

The invention claimed is:

1. An autosampler for a chromatograph, comprising:
a first injection port through which a sample is injected into a first analysis flow path of the chromatograph;
a second injection port through which a sample is injected into a second analysis flow path of the chromatograph;
a needle that is movable to both of the first injection port and the second injection port, and injects a sample into the first injection port and the second injection port;
a first sample loop that stores a sample to be injected into the first analysis flow path;
a second sample loop that stores a sample to be injected into the second analysis flow path;
a metering pump that loads a sample in the first sample loop and the second sample loop;
a first valve that switches a connection among the first injection port, the first sample loop and the first analysis flow path; and
a second valve that switches a connection among the second injection port, the second sample loop and the second analysis flow path.

2. The autosampler for a chromatograph according to claim 1,
wherein
the first valve has the first sample loop and the second valve has the second sample loop when operating using a loop injection system, and
the first valve does not have the first sample loop and the second valve has the second sample loop when operating using a total volume injection system.

3. The autosampler for a chromatograph according to claim 2, wherein
a sample is stored in the first sample loop and the second sample loop, and then analysis processes are synchronously executed in the first analysis flow path and the second analysis flow path by synchronous operations of the first valve and the second valve.

4. The autosampler for a chromatograph according to claim 2, wherein
a sample is stored in the second sample loop by arrangement of the needle in the second injection port, and then the needle is arranged in the first injection port with a sample stored in the first sample loop, in a case where the first valve operates using the total volume injection system.

5. The autosampler for a chromatograph according to claim 2, wherein
in a case where the first valve operates using the loop injection system,
the first sample loop is connected to the metering pump by switch of the first valve to a first position and arrangement of the needle in the first injection port, and a sample is stored in the first sample loop through the first injection port by an operation of the metering pump,
the second sample loop is connected to the metering pump by switch of the second valve to a first position and arrangement of the needle in the second injection port, and a sample is stored in the second sample loop through the second injection port by an operation of the metering pump,
the first sample loop is connected to the first analysis flow path by switch of the first valve to a second position, and a sample stored in the first sample loop is thus supplied to the first analysis flow path, and
the second sample loop is connected to the second analysis flow path by switch of the second valve to a second position, and a sample stored in the second sample loop is thus supplied to the second analysis flow path.

6. The autosampler for a chromatograph according to claim 2, wherein
in a case where the first valve operates using the total volume injection system,
with a sample stored in the first sample loop, the second sample loop is connected to the first sample loop and the metering pump by switch of the second valve to a first position and arrangement of the needle in the second injection port, a sample in the first sample loop is stored in the second sample loop through the second injection port by an operation of the metering pump,
the first valve is subsequently switched to a first position and the needle is arranged in the first injection port,
the second sample loop is connected to the second analysis flow path by switch of the second valve to a second position, and a sample stored in the second sample loop is thus supplied to the second analysis flow path, and
the first sample loop is connected to the first analysis flow path by switch of the first valve to a second position, and a sample stored in the first sample loop is thus supplied to the first analysis flow path.

* * * * *